Sept. 25, 1962          G. BOZZETTO          3,055,929
CONTINUOUS SULPHONATION OF ORGANIC SUBSTANCES
Filed Oct. 1, 1958
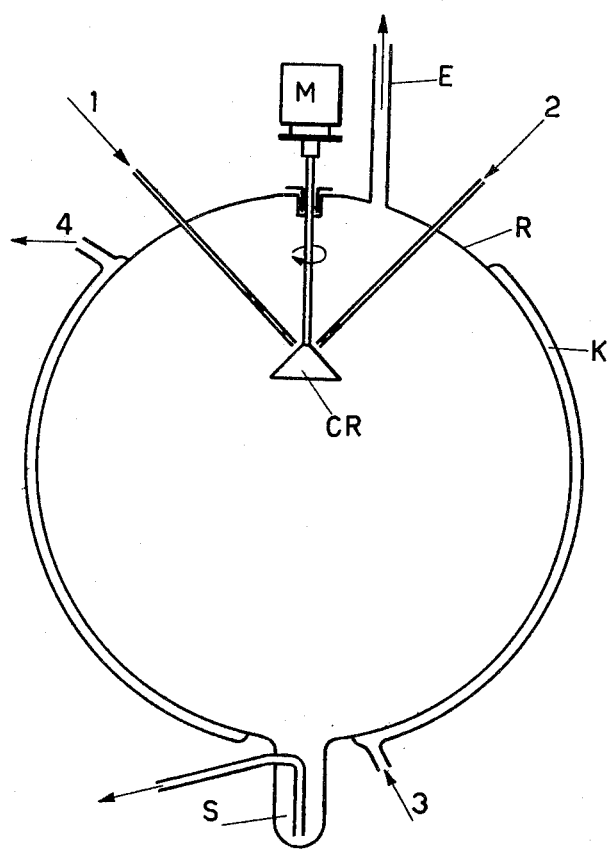

United States Patent Office 3,055,929
Patented Sept. 25, 1962

3,055,929
CONTINUOUS SULPHONATION OF ORGANIC SUBSTANCES
Giuseppe Bozzetto, Via Baioni 18, Bergamo, Italy
Filed Oct. 1, 1958, Ser. No. 764,601
Claims priority, application Italy June 14, 1958
2 Claims. (Cl. 260—459)

This invention is related to a continuous process of sulphonation of organic substances, and more particularly to sulphonation processes employing chlorsulfonic acid ($CH.SO_2.Cl$) as the sulphonating agent.

Generally speaking, the reactions in which one of the end products is obtained in the gaseous phase have the great advantage of continuous shifting of equilibrium in either direction so that the rapid progress of the reaction concerned is considerably encouraged.

Very often, however, serious drawbacks are experienced when carrying out such reactions on a commercial scale, either due to the rate at which the reaction progresses, or owing to the necessity of removing the heat generated during the reaction in the case of exothermic reactions, and also due to the difficulty with which the gaseous phase is separated from the liquid phase if the latter is viscous, especially when the liquid phase is a solvent for the gases evolved during the reaction. In the circumstances, it is often necessary to employ large apparatuses in order to confine the foam which is, in many cases, voluminous and difficult to suppress or kill.

The cooling of the reaction mass, which is necessary in order that the reaction may be confined within a selected optimal temperature range, is seriously hindered by the reduced rate of heat transfer of the foams so that the rate of reaction has to be artificially reduced.

In the treatment of organic compounds with chlorsulfonic acid, other drawbacks are experienced in addition to those mentioned above, said additional drawbacks being due to the chemical and physical nature of the gaseous hydrochloric acid evolved throughout the reaction.

It is known that sulphonated or sulphated acids retain a portion of hydrogen chloride and it has been proved that the contact of said gas with the liquid phase may cause a number of side reactions, such as, for example, condensations, polymerizations, saturations of double bonds, saponifications and other generally undesirable reactions.

It is also known that the treatment of certain chemical compounds, for example fatty alcohols, with chlorsulfonic acid, requires a rapid mixing and a rapid dispersion of the reaction heat in order to reduce the carbonization of the reaction product to an acceptable minimum, since carbonization would be, in the subsequent neutralization stage, conducive to more or less stained products having a lessened commercial value.

It is also unquestionable that the high corrosive strength of hydrogen chloride entails the use of costly materials for the apparatus and involves expensive repair and upkeep. In order to attenuate corrosion, it has been attempted to prevent, insofar as possible, the entrance of moist air into the reactors, but the results achieved thereby have hitherto proven to be poor.

Consistently with recently achieved technical advancements, it had also been attempted to perform the treatment of organic compounds with chlorsulfonic acid in a continuous manner: by applying a number of contrivances in attempting to overcome the above mentioned difficulties, methods of operation and apparatuses had been suggested whereby the lamented drawbacks have been but partly reduced.

Thus, a continuous process has been suggested in which the reactants (higher fatty alcohols and chlorsulfonic acid) are dispersed in an inert gas under pressure, thereby obtaining a mist within the reactor and utilizing the expansion of the inert gas for the necessary cooling and for a fine dispersion of the reactants.

Another process had also been disclosed, in which the reaction is carried out in concentric chambers formed by foraminous cylindrical walls mounted on a rotary disk. This latter process provides for the induction into the reactor, and, more precisely, above the reaction chambers, of large volumes of dry, cold air for dispersing the heat generated during the exothermic reaction.

An attempt had also been made to project the liquid reactants against an externally cooled wall thereby dispersing the reaction heat. Another suggested continuous process employs an apparatus which is a sort of centrifuge. The reaction components are introduced at the bottom of a rotating drum and the centrifugal force causes them to creep along the cooled wall, to be discharged at the top by overflowing the drum's uppermost edge.

In the process of this invention, no induction of inert fluids in the reactor, is resorted to, either for cooling, or dispersion of reactants, or for any other purpose. According to my invention the reaction between the chlorsulfonic acid and the substance to be sulphonated takes place, almost in its entirety, in a space defined between a conical rotor installed in the reactor and the reactor wall, said reactor being completely closed and kept under reduced pressures, by means of a suction pump to which the exhaustion of the hydrogen chloride from the reactor is entrusted, in addition to the establishment of a vacuum inside the reactor, which is essential to my invention.

The value of the reaction temperature is not critical in itself since the temperature range may vary widely depending on the raw materials being treated. Generally speaking, however, the usual temperature range is from about 30° C. to about 85° C., since too much higher temperatures would lead to decomposition of the sulphonated product. The rate of rotation of the conical rotor is the one usual for this sort of apparatus. The reaction times are also not critical, since the process of this invention is practically continuous, as will be shown hereinafter.

The continuous discharge of the reacted product, that is, the sulphonic acid, takes place by means of a hydraulic seal which prevents any entrance of air within the reactor.

Since the entire reaction takes place in an enclosure which is continuously maintained under reduced pressures, the evolution of hydrogen chloride and its separation from the liquid phase take place in an extremely easy and rapid fashion.

As outlined above, the exhaustion of the hydrogen chloride from the reactor is entrusted to a specially provided suction pump connected to the reactor, said pump also providing the degree of vacuum necessary to the practice of my process.

It is to be borne in mind that the process embodying my invention can be performed in any reactor of conventional make, providing that it is equipped with a conical rotor in a generally central position, and equipped with a suction pump or other equivalent means capable of establishing a subatmospheric pressure within the reactor and of withdrawing the evolved hydrogen chloride as well.

Such an apparatus, an embodiment of which will be briefly described hereafter, is not a part of the present invention and is illustrated in the accompanying drawing merely to facilitate the understanding of the process embodying this invention.

In the drawing, the apparatus is shown to include a spherical reactor e.g. a "Pyrex" glass reactor R, equipped with tubes 1 and 2 for induction of chlorsulfonic acid and of a higher fatty alcohol, respectively, and with a tube E connected to a vacuum pump (not shown) for establishing a vacuum in the reactor R and simultaneously removing the evolved hydrogen chloride as well. The reactor R is equipped with a centrally located conical rotor CR rotatably driven by a motor M, and is completed by a water-jacket K whose cooling fluid entrance and exit tubes are connoted by the numerals 3 and 4 respectively. At the bottom of the reactor R a seal S is provided for discharging the sulphated acid which is then sent to the neutralization stage (not shown).

By employing, for performing the process of my invention, a reactor such as that exemplarily described above and having a diameter (overall) of about 50 cms. (corresponding to an effective capacity of about 100 liters), it has been possible to sulphonate 30 kgs. of fatty alcohols, corresponding to about 90 kgs. of sulphonated paste per hour, whereas by employing a reactor of conventional make and the conventional process, the reactor having an effective capacity of 200 liters, the output has been only 10 kgs. per hour of fatty alcohols, corresponding to 30 kgs. of sulphonated paste.

Furthermore, considerable savings in labor, electric power and cooling water consumption have been made possible by the process of my invention as compared with the prior art processes.

By applying the above described means, it has been surprisingly ascertained that not only the countless difficulties such as foam formation, slow rate of heat transfer, discolorations due to carbonization, etc., are immediately overcome, but in addition a number of remarkable advantages are obtained such as:

(1) An almost total removal of hydrogen chloride from the liquid phase is so rapidly obtained that the occurrence of any possible side reactions is virtually prevented;
(2) The rapid expansion of nascent hydrogen chloride causes a considerable cooling effect whereby my reactor can operate with very little external cooling, or without any cooling altogether;
(3) The rapid exhaustion of hydrogen chloride from the liquid phase rapidly shifts the reaction equilibrium towards the favorable direction, that is, considerably increases the rate of reaction, so that the reaction takes place, almost entirely, along the same path followed by the reacting liquids and in a very short time;
(4) The increase of the rate of reaction is obtained without any attendant damage to the end products, and thus considerably increases the output capacity of the reactor so that the reactor size can be considerably reduced, as has been indicated above in the brief description of a preferably employed reactor.

The sulphated or sulphonated product which is continuously discharged from the reactor, may be neutralized either by a batch or a continuous process, the latter procedure being preferable: the neutralization process, however, is not a part of the instant invention and no claim is made thereto.

While discontinuous neutralization is always started with a strong excess of alkalies, and only during progress of the reaction the desired pH of 7–8 is attained, the continuous process of this invention advantageously permits the continuous obtention of the desired sulphated products within any preselected pH range and at any desired concentration.

The invention is illustrated but not limited by the following examples, in which all parts and percentages are by weight, all the measures in the metric system, and the temperatures are expressed in degrees centigrade.

*Example 1*

Having reference to the drawing, on a conical rotor CR installed in a reactor R of the kind described, in which an absolute pressure of 600 mms. of mercury is maintained, there are poured, by means of two separate tubes such as 1, 2 in the accompanying drawing: a mixture of saturated higher primary alcohols (hydroxyl number 256, M.P. 23° C., specific gravity at 20° C.: 0.834) and chlorsulfonic acid. The two reactants continuously enter the reactor R at a weight ratio of 150 parts of fatty alcohols to 81 parts of chlorsulphonic acid.

The reaction mixture is projected by the conical rotor towards the reactor wall at a temperature decreasing from about 85° C. to about 30° C., the evolved (almost quantitatively) hydrogen chloride being exhausted from the reactor via the piping E.

The sulphation product, which reaches the wall of the reactor at a temperature of about 30° C., is continuosuly discharged and then neutralized in a continuous neutralizer (not shown in the drawing), for example with 12% aqueous NaOH.

The sodium alkylsulphates or sulphonates, thus obtained in the form of a perfectly white paste substantially free from emulsified air, exhibit a high degree of sulphonation.

*Example 2*

A reactor, such as that shown in the accompanying drawings, and kept under an absolute pressure of 100 mms. of mercury is charged, in a manner similar to that of Example 1, with 150 parts of commercial oleic alcohol (iodine number 77; hydroxyl number 206; specific gravity at 20° C.: 0.848) and 65 parts of chlorsulfonic acid.

The temperature of the sulphated product decreases, as it proceeds from the conical rotor to the reactor wall, from 80° C. to 38° C. Said product arrives, at that temperature, on the externally cooled wall of the reactor and undergoes a further cooling to 30° C. (due to the supply of external cooling K), after which it is discharged towards the bottom of said reactor and is continuously passed through the hydraulically sealed outlet members, to be finally neutralized either by continuous or discontinuous neutralization method, e.g. with 10% aqueous sodium hydroxide. The yellow paste thus obtained exhibits a high degree of sulphonation. The alkyl sulphonate or sulphate has retained as much as 86% of the double bonds contained in the original fatty alcohol molecule.

What is claimed is:
1. A process for the continuous sulfation of higher fatty alcohol, comprising the steps of separately introducing the alcohol and chlorsulfonic acid adjacent the center of a reaction vessel, centrifugally propelling the introduced alcohol and the chlorsulfonic acid toward the side wall of said vessel so that continuous sulfation of the alcohol occurs during the centrifugal movement thereof in said vessel, and continuously evacuating said vessel so as to maintain a subatmospheric pressure therein while exhausting from the vessel the hydrogen chloride evolved during said continuous sulfation.

2. A process as in claim 1; wherein said subatmospheric pressure is an absolute pressure of approximately 600 mm. of mercury.

References Cited in the file of this patent

UNITED STATES PATENTS

| 2,673,211 | Blinoff | Mar. 23, 1954 |

FOREIGN PATENTS

| 553,598 | Great Britain | May 27, 1943 |
| 881,876 | France | May 11, 1943 |
| 71,192 | Norway | Sept. 15, 1944 |
| 844,150 | Germany | July 17, 1952 |
| 897,101 | Germany | Nov. 19, 1953 |